US012562184B2

(12) United States Patent
Wang et al.

(10) Patent No.: US 12,562,184 B2
(45) Date of Patent: Feb. 24, 2026

(54) SYNTHETIC SPEECH DETECTION

(71) Applicant: Microsoft Technology Licensing, LLC, Redmond, WA (US)

(72) Inventors: Ke Wang, Beijing (CN); Lei He, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 36 days.

(21) Appl. No.: 18/040,812

(22) PCT Filed: Apr. 21, 2021

(86) PCT No.: PCT/CN2021/088623
§ 371 (c)(1),
(2) Date: Feb. 6, 2023

(87) PCT Pub. No.: WO2022/222056
PCT Pub. Date: Oct. 27, 2022

(65) Prior Publication Data
US 2024/0005947 A1 Jan. 4, 2024

(51) Int. Cl.
*G10L 25/78* (2013.01)
*G06F 21/55* (2013.01)

(52) U.S. Cl.
CPC .............. *G10L 25/78* (2013.01); *G06F 21/55* (2013.01)

(58) Field of Classification Search
CPC ......... G10L 25/78; G10L 17/06; G10L 17/18; G10L 25/30; G10L 25/51; G06F 21/55; G06N 7/01; G06N 3/0464; G06N 3/0475; G06N 3/084
See application file for complete search history.

(56) References Cited

U.S. PATENT DOCUMENTS

| | | | |
|---|---|---|---|
| 9,142,218 B2 | 9/2015 | Schroeter | |
| 9,466,299 B1 | 10/2016 | Feltham et al. | |
| 9,484,036 B2 | 11/2016 | Kons et al. | |

(Continued)

FOREIGN PATENT DOCUMENTS

| | | | |
|---|---|---|---|
| CN | 109655815 A | 4/2019 | |
| CN | 110491391 A | 11/2019 | |

(Continued)

OTHER PUBLICATIONS

Choi, et al., "Neural MOS Prediction for Synthesized Speech using Multi-Task Learning with Spoofing Detection and Spoofing Type Classification", In Repository of arXiv:2007.08267v2, Dec. 2, 2020, 8 pages.

(Continued)

*Primary Examiner* — Huyen X Vo
(74) *Attorney, Agent, or Firm* — Foley IP Law, PLLC

(57) ABSTRACT

Systems and methods for synthetic speech detection includes receiving an input sample comprising audio and extracting acoustic features corresponding to speech in the audio. The extracted acoustic features are processed using a plurality of neural networks to output abstracted features and generating a feature vector corresponding to the abstracted features using pooling. Training of an SSD task, a speaker classification task, and a channel classification task are performed at a same time, using the feature vector. Synthetic speech is detected using at least the trained SSD task.

16 Claims, 8 Drawing Sheets

(56)                 References Cited

U.S. PATENT DOCUMENTS

| | | | | |
|---|---|---|---|---|
| 9,824,692 | B1 * | 11/2017 | Khoury | G10L 17/18 |
| 12,015,637 | B2 * | 6/2024 | Lakhdhar | G10L 17/04 |
| 2011/0112833 | A1 * | 5/2011 | Frankel | G06F 16/685 |
| | | | | 704/235 |
| 2016/0284347 | A1 | 9/2016 | Sainath et al. | |
| 2019/0325861 | A1 * | 10/2019 | Singh | G06N 3/044 |
| 2020/0321009 | A1 | 10/2020 | Khoury | |
| 2021/0005067 | A1 * | 1/2021 | Salekin | G08B 13/1672 |
| 2022/0095061 | A1 * | 3/2022 | Diehl | G06N 3/088 |
| 2022/0172739 | A1 * | 6/2022 | Shor | G10L 15/22 |

FOREIGN PATENT DOCUMENTS

| | | | |
|---|---|---|---|
| CN | 110648655 | A | 1/2020 |
| CN | 111276131 | A | 6/2020 |
| CN | 111324696 | A | 3/2023 |
| WO | 2021002967 | A1 | 1/2021 |

OTHER PUBLICATIONS

He, et al., "Deep Residual Learning for Image Recognition", In Proceedings of the IEEE Conference on Computer Vision and Pattern Recognition, Jun. 27, 2016, pp. 770-778.

Lavrentyeva, et al., "STC Antispoofing Systems for the ASVspoof2019 Challenge", In Repository of arXiv:1904.05576v1, Apr. 11, 2019, 5 Pages.

Li, et al., "Anti-Spoofing Speaker Verification System with Multi-Feature Integration and Multi-Task Learning-", In Proceedings of Annual Conference of the International Speech Communication Association, Sep. 15, 2019, pp. 1048-1052.

Reimao, Ricardo, "Synthetic Speech Detection Using Deep Neural Networks", In Thesis of York University, May 2019, 156 Pages.

Zhao, et al., "Multi-task Learning Based Spoofing-Robust Automatic Speaker Verification System", In Journal of Latex Class Files, vol. 14, Issue 8, Aug. 2015, pp. 1-12.

Chen, et al., "Channel Invariant Speaker Embedding Learning with Joint Multi-Task and Adversarial Training", IEEE International Conference on Acoustics, Speech and Signal Processing (ICASSP), 2020, pp. 6574-6578.

Extended European Search Report received for EP Application No. 21937300.8, mailed on Oct. 15, 2024, 10 pages.

"International Search Report and Written Opinion Issued in PCT Application No. PCT/CN2021/088623", Mailing Date: Jan. 19, 2022, 8 Pages.

First Office Action Received for Chinese Application No. 202180044082.8, mailed on Jul. 31, 2025, 17 pages. (English Translation Provided).

* cited by examiner

SYNTHETIC SPEECH DETECTION

BACKGROUND

Artificial Intelligence (AI)-synthesized techniques have many different applications. For example, AI can be used to create highly sounded realistic, indistinguishable, and natural voices. The voices can be so realistic that it is difficult for human ears and speaker recognition/verification systems to identify the voices as synthetic media (e.g., DeepFakes). As a result, individuals or recognition/verification systems may incorrectly confirm the synthetic media voice as a real voice of a person, thereby potentially allowing unauthorized access to different systems.

Thus, known systems may not satisfactorily detect or identify the realistic synthetic voices, such that systems are not adequately protected against these synthetically created voices when used for fraudulent or other improper means. For example, artificial attacks and replay attacks (referred to as physical attacks (PA)), and text to speech (TTS) and voice conversion attacks (referred to as logical attacks (LA)) are increasing. However, known detection systems have models that are often trained on a small dataset (e.g., no more than 50 speakers) for a specific task, resulting in models that are hard to apply in practice and often do not adequately address both PAs and LAs in a single architecture.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for synthetic speech detection (SSD) comprises receiving an input sample comprising audio and extracting acoustic features corresponding to speech in the audio. The computerized method further comprises processing the extracted acoustic features using a plurality of neural networks to output abstracted features and generating a feature vector corresponding to the abstracted features using pooling. The computerized method also comprises performing training of an SSD task, a speaker classification task, and a channel classification task, at a same time, using the feature vector. The computerized method further comprises detecting synthetic speech using at least the trained SSD task.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
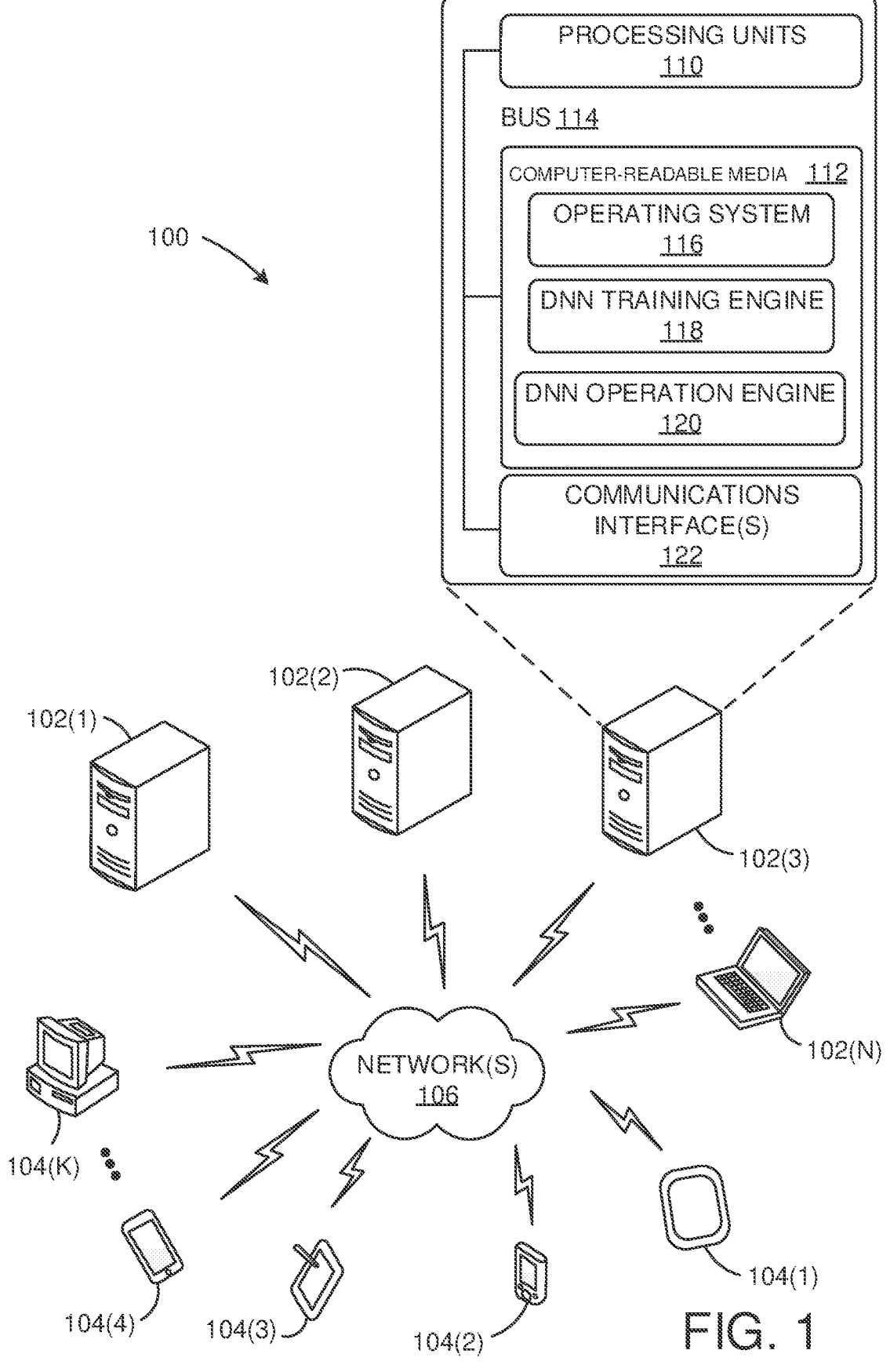
FIG. 1 is a block diagram illustrating an operating environment according to an example.

The computing devices and methods described herein are configured to provide a multi-task synthetic speech detection (SSD) framework to detect synthetic media, particularly synthetic voice (e.g., DeepFakes). For example, with one or more voice clip examples, a clip of voice that is synthesized with AI can be more reliably distinguished from a clip of voice spoken by humans. The SSD is configured to detect the synthesized speech using a text to speech service (e.g., Microsoft TTS) trained according to various examples. The SSD can be extended to detect the synthesized speech by other TTS producers, as well as to detect the voice identity of a synthesized speech, such as to detect if the voice is synthesized by an AI system. For example, the SSD can be implemented as part of a front-end of a speaker recognition system to enhance security and/or can be used as an assessment system for the relative trustworthiness of TTS.

In one example, SSD, speaker classification, and channel classification training tasks are combined, allowing for improved learning and more robust and effective feature embeddings than a single task framework. Additionally, some examples consider the effects of codec (coder-encoder) on SSD. Certain tasks, such as the classification tasks, can be "pruned" to further increase the computing speed during the inference stage according to the task (e.g., multi-task to a single task). As a result. PA and LA, which are often regarded as two different tasks and two different models, are trained together by the present disclosure without performance degradation on detection of both attacks. Various examples also consider speaker information for SSD, making the detection more robust while not degrading performance on outset voices and systems. In this manner, when a processor is programmed to perform the operations described herein, the processor is used in an unconventional way that allows for more efficient and reliable synthetic voice detection, which results in an improved user experience.

In various examples, a large dataset is built using different TTS acoustic models and vocoders (and thousands of speakers are included in the training set). A unified framework is also provided in which both TTS (LA attack) and replayed TTS (PA attack) are considered in a unified model when using the large dataset and a multi-task framework as described in more detail herein. In some examples, channel classification is added to the multi-task framework, as well as consideration of noise and reverberation, which improves the robustness of detecting, for example, codec attacks.

Described herein are enhanced techniques for training neural networks, including deep neural networks (DNNs), to improve use in performing pattern recognition and data analysis, such as speech recognition, speech synthesis, regression analysis or other data fitting, image classification, or face recognition. In various examples, e.g. of DNNs trained for speech recognition or other applications, the DNNs may be context-dependent DNNs or context-independent DNNs. A DNN can have at least two hidden layers. A neural network trained using techniques herein can have one hidden layer, two hidden layers, or more than two hidden layers. In one example, e.g., useful with speech recognition systems, a neural network or DNN as described herein has between five and seven layers. Herein-described techniques relating to DNNs also apply to neural networks with less than two hidden layers. In some examples, such as for speech recognition, the context-dependent DNNs may be used in conjunction with hidden Markov Models (HMMs). In such examples, the combination of context-dependent DNNs and HMMs is known as context-dependent DNN-HMMs (CD-DNN-HMMs). Thus, the techniques described herein for training DNNs may be applied to train the CD-DNN-HMMs. The techniques described herein may include the use of processes to parallelize the training of the DNNs across multiple tasks and/or processing units, e.g., cores of a multi-core processor or multiple general-purpose graphics processing units (GPGPUs) and using a plurality of classifiers (configured as feed-forward layers as described in more detail herein). Accordingly, multiple layers of DNNs may be processed in parallel on the multiple processing units.

FIG. 1 shows an environment 100 in which examples of DNN training systems can operate or in which methods such as DNN training methods can be performed, particularly for use in SSD. In some examples, the various devices or components of the environment 100 include computing device(s) 102(1)-102(N) (individually or collectively referred to herein with reference 102) and computing devices 104(1)-104(K) (individually or collectively referred to herein with reference 104) that can communicate with one another via one or more network(s) 106. In some examples, N=K. In other examples, N>K or N<K.

In some examples, the computing devices 102 and 104 can communicate with external devices via the network(s) 106. For example, the network(s) 106 can include public networks such as the Internet, private networks such as an institutional or personal intranet, or a combination of private and public networks. The network(s) 106 can also include any type of wired or wireless network, including but not limited to local area networks (LANs), wide area networks (WANs), satellite networks, cable networks, Wi-Fi networks. WiMAX networks, mobile communications networks (e.g., 3G, 4G, and so forth) or any combination thereof. The network(s) 106 can utilize communications protocols, including packet-based or datagram-based protocols such as internet protocol (IP), transmission control protocol (TCP), user datagram protocol (UDP), other types of protocols, or combinations thereof. Moreover, the network(s) 106 can also include a number of devices that facilitate network communications or form a hardware basis for the networks, such as switches, routers, gateways, access points, firewalls, base stations, repeaters, backbone devices, and the like. The network(s) 106 can also include devices that facilitate communications between the computing devices 102, 104 using bus protocols of various topologies. e.g., crossbar switches, or fiber channel switches or hubs.

In some examples, the network(s) 106 can further include devices that enable connection to a wireless network, such as a wireless access point (WAP). One or more examples support connectivity through WAPs that send and receive data over various electromagnetic frequencies (e.g., radio frequencies), including WAPs that support Institute of Electrical and Electronics Engineers (IEEE) 802.11 standards (e.g., 802.11g. 802.11n, and so forth), other standards, e.g., Bluetooth, or multiples or combinations thereof.

In various examples, at least some of the computing devices 102(1)-102(N) or 104(1)-104(K) can operate in a cluster or grouped configuration to, e.g., share resources, balance load, increase performance, or provide fail-over support or redundancy. The computing device(s) 102, 104 can belong to a variety of categories or classes of devices such as client-type or server-type devices, desktop computer-type devices, mobile-type devices, special purpose-type devices, embedded-type devices, or wearable-type devices. Thus, although illustrated as, e.g., desktop computers, laptop computers, tablet computers, or cellular phones, the computing device(s) 102, 104 can include a wide variety of device types and are not limited to a particular type of device. The computing device(s) 102 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, computer navigation type client computing devices, satellite-based navigation system devices including global positioning system (GPS) devices and other satellite-based navigation system devices, telecommunication devices such as mobile phones, tablet computers, mobile phone-tablet hybrid devices, personal data assistants (PDAs), or other computing device(s) configured to participate in DNN training or operation as described herein. In at least one example, the computing device(s) 102 include servers or high-performance computers configured to train DNNs. In at least one example, the computing device(s) 104 include laptops, tablet computers, smartphones, home desktop computers, or other computing device(s) configured to operate trained DNNs, e.g., to provide SSD for a speech input.

The computing device(s) 102, 104 can include various components, for example, any computing device having one or more processing unit(s) 110 operably connected to one or more computer-readable media 112 such as via a bus 114, which in some examples can include one or more of a system bus, a data bus, an address bus, a PCI bus, a Mini-PCI bus, and any variety of local, peripheral, or independent buses, or any combination thereof. In at least one example, a plurality of processing units 110 exchange data through an internal interface bus (e.g. PCIe), rather than or in addition to the network 106. Executable instructions stored on the computer-readable media 112 can include, for example, an operating system 116, a DNN training engine 118, a DNN operation engine 120, and other modules, programs, or applications that are loadable and executable by the processing unit(s) 110. In an example not shown, one or more of the processing unit(s) 110 in one of the computing device(s) 102, 104 can be operably connected to computer-readable media 112 in a different one of the computing device(s) 102, 104, e.g., via communications interface 122 and the network 106. For example, program code to perform DNN training steps or operations described herein can be downloaded from a server, e.g., the computing device 102 (1), to a client, e.g., the computing device 104(K), e.g., via the network 106, and executed by one or more of the processing unit(s) 110 in the computing device 104(K). In one example, the computing device(s) 102(1)-102(N)

include the DNN training engine 118, and the computing device(s) 104(1)-104(K) include the DNN operation engine 120.

The processing unit(s) 110 can be or include one or more single-core processors, multi-core processors, central processing units (CPUs), graphics processing units (GPUs), general-purpose graphics processing units (GPGPUs), or hardware logic components such as accelerators configured, e.g., via programming from modules or APIs, to perform the functions described herein. For example, and without limitation, illustrative types of hardware logic components that can be used in or as the processing units 110 include Field-programmable Gate Arrays (FPGAs), Application-specific Integrated Circuits (ASICs), Application-specific Standard Products (ASSPs), System-on-a-chip systems (SOCs). Complex Programmable Logic Devices (CPLDs), and Digital Signal Processors (DSPs).

The processing unit(s) 110 can be configured to execute an operating system 116 that is installed on the computing device 102. In some examples, the processing unit(s) 110 can be or include general-purpose graphics processing units (GPGPUs). In further examples, the processing units 110 can be field-programmable gate arrays (FPGAs), or another type of customizable processor. In various examples, at least some of computing device(s) 102(1)-102(N) can include a plurality of processing units 110 of multiple types. For example, the processing units 110 in computing device 102(1) can be a combination of one or more GPGPUs and one or more FPGAs.

The computing device 102 can also include one or more communications interfaces 122 to enable wired or wireless communications between computing device 102 and other networked computing devices 102 involved in DNN training (or other operations), or other computing device(s), over network(s) 106. Such communications interface(s) 122 can include one or more transceiver devices, e.g., network interface controllers (NICs) such as Ethernet NICs, to send and receive communications over a network. The processing units 110 can exchange data through the communications interface 122. In one example, the communications interface 122 can be a Peripheral Component Interconnect express (PCIe) transceiver, and the network 106 can be a PCIe bus. In some examples, the communications interface 122 can include, but is not limited to, a transceiver for cellular, Wi-Fi, Ultra-wideband (UWB), Bluetooth, or satellite transmissions. The communications interface 122 can include a wired I/O interface, such as an Ethernet interface, a serial interface, a Universal Serial Bus (USB) interface, or other wired interfaces. For simplicity, these and other components are omitted from the illustrated computing device 102.

While the processing units 110 are described as residing on the computing device 102 and connected by the communications interface 122 in various examples, the processing units 110 can also reside on different computing devices in some examples. In some examples, the processing units 110 can reside on corresponding computing devices 102, and exchange data through a network 106 via communications interface 122. In some examples, at least two of the processing units 110 reside on different computing devices 102. In such examples, multiple processing units 110 on the same computing device 102 use an interface bus 114 of the computing device 102 to exchange data, while processing units 110 on different computing devices 102 exchange data via network(s) 106.

In some examples, the computer-readable media 112 stores instructions executable by the processing unit(s) 110 that, as discussed above, can represent a processing unit incorporated in the computing device 102. The computer-readable media 112 can also store instructions executable by external processing units such as by an external CPU or external processor or accelerator of any type discussed above. In various examples, at least one processing unit 110, e.g., a CPU, GPU, or accelerator, is incorporated in the computing device 102, while in some examples at least one processing unit 110. e.g., one or more of a CPU, GPU, or accelerator, is external to the computing device 102.

The computer-readable media 112 of the computing device 102 can store an operating system 116. In various examples, the operating system 116 can include components that enable or direct the computing device 102 to receive data via various inputs (e.g., user controls, network or communications interfaces, or memory devices), and process the data using the processing unit(s) 110 to generate output. The operating system 116 can further include one or more components that present the output (e.g., display an image on an electronic display, store data in memory, transmit data to another electronic device, etc.). The operating system 116 can enable a user to interact with modules of the training engine 118 using a user interface (not shown). Additionally, the operating system 116 can include components that perform various functions generally associated with an operating system, e.g., storage management and internal-device management.

Figure 2:
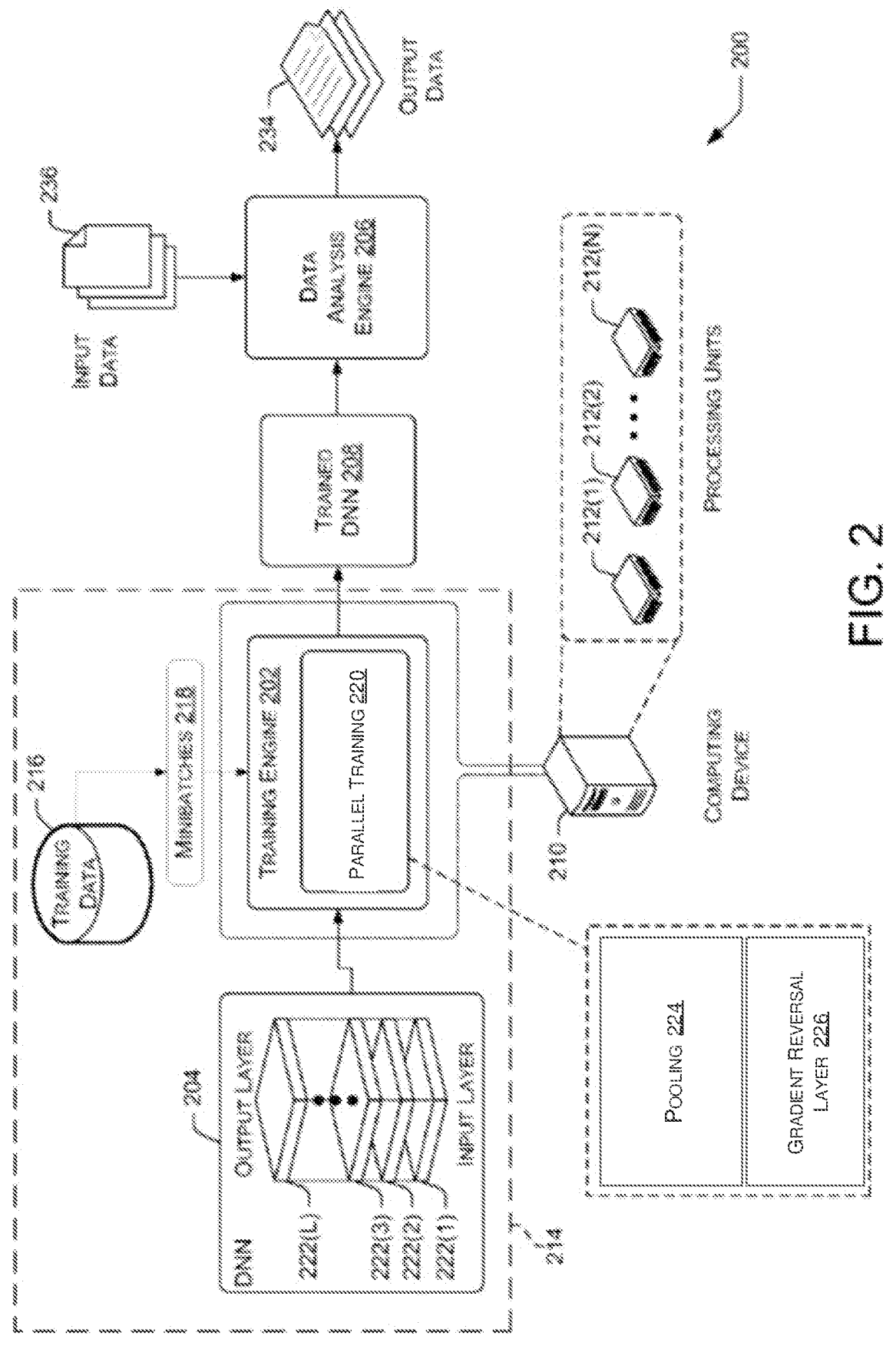
FIG. 2 is a block diagram illustrating an operating configuration according to an example.

FIG. 2 is a block diagram that illustrates an example operating configuration 200 for implementing a training engine 202, such as the training engine 118, that uses one or more aspects of the present disclosure to train a DNN 204 (or a plurality of DNNs, and likewise throughout), and for implementing a data analysis engine 206, such as the DNN operation engine 120, to operate the trained DNN 208. The training engine 202 can be implemented using a computing device 210, which in some examples includes the computing device(s) 102. The data analysis engine 206 can be implemented using a computing device such as the computing device(s) 104. For clarity, a separate computing device implementing the data analysis engine 206 is not shown in FIG. 2. In at least one example, the computing device 210 implements both the training engine 202 and the data analysis engine 206. The computing device 210 can include one or more processing units 212(1)-212(N), which can represent the processing units 110(1)-110(N) as discussed above with reference to FIG. 1. The processing units 212(1)-212(N) are individually or collectively referred to herein with reference 212. In some examples, the processing units 212 can be processing units 212 as discussed above with reference to FIG. 1, e.g., GPGPUs. The processing units 212 can exchange data through the bus 114 or the network 106, both illustrated in FIG. 1. The processing units 212 can carry out instructions of the DNN training block 214 including the DNN 204, the training engine 202, the training data 216, and minibatches 218 of training data 216.

The DNN training can be performed by multiple nodes in a parallel manner to reduce the time required for training and in one example is configured as a multi-task solutions as described in more detail herein. In at least one example, the training engine 202 executes on each of a plurality of computing devices 210, and each computing device 210 has a single-core processing unit 212. Each such computing device 210 is a node in this example. In some examples, the training engine 202 executes on a single computing device 210 having a plurality of multi-core processing units 212. In such examples, each core of the multi-core processing units 212 represents a node. Other combinations, and points between these extremes, can also be used. For example, an individual accelerator (e.g., an FPGA) can include one or more nodes. In other examples, multiple cores of the processing unit 212 can be configured to operate together as a single node.

The training engine 202 in one example uses parallel training 220 to train the DNN 204 for performing data analysis, such as for use in speech recognition (e.g., SSD). For example, as described in more detail herein, SSD, speaker identification and channel classification task are learned simultaneously.

The DNN 204 can be a multi-layer perceptron (MLP). As such, the DNN 204 can include a bottom input layer 222(1) and a top layer 222(L) (integer L>1), as well as multiple hidden layers, such as the multiple layers 222(2)-222(3). The layers 222(1)-222(L) are individually or collectively referred to herein with reference 222. In some examples, using context dependent DNNs, the DNN 204 can include a total of eight layers (N=8). In various examples, the DNN 204 can be context-dependent DNNs or context-independent DNNs. The training data 216 can be used by the parallel training 220 as training data to train the DNN 204. The training data 216 can include a speech corpus that includes audio data of a collection of sample speech from a large set of human speakers. For example, the speech corpus can include North American English speech samples collected from speakers of North American English in the United States and Canada. However, in other examples, the training data 216 can include sample speech in other respective languages (e.g., Chinese, Japanese, French, etc.), depending on the desired language of the speech to be recognized, or other kinds of training data for different applications like handwriting recognition or image classification. The training data 216 can also include information about the correct recognition or classification answers for the corpus. Using this information, errors can be detected in the processing of the corpus by the DNN 204. This information can be used, e.g., in computing one or more features as part of gradient reversal layer as described in more detail herein.

The computations performed by the parallel training 220 can be parallelized across the processing units 212. For example, during feed-forward processing, a computation on input data performed by the processing unit 212(1) can produce a first computation result. The first computation result can be pipelined to the processing unit 212(2) for further computation to generate a second computation result. Concurrent with the generation of the second computation result, the processing unit 212(1) can be processing additional input data to generate a third computation result. In at least some examples, concurrent with the generation of the second computation result, the processing unit 212(1) can be transferring at least part of the first computation result to another processing unit 212. Such concurrent computations by the processing units 212 or other examples of nodes can result in a pipelining of computations that train the DNN 204, and, accordingly, to a reduction of computation time due to the resulting parallelism of computation. Concurrent computation and communication by the processing units 212 or other examples of nodes can result in reduced delay time waiting for data to arrive at a node and, accordingly, to a reduction of overall computation time. In various examples, the computations performed by the parallel training 220 can be enhanced using one or more techniques, such as pooling 224 in combination with a gradient reversal layer 226.

Further, the layers 222(1)-222(L) in the DNN 204 can have varying sizes due to differences in the number of units in various layers of the DNN 204. For example, a largest layer in the DNN 204 can have a size that is ten times larger than that of the one or more smallest layers. Accordingly, it may be more efficient to devote a particular multi-core processor to process the largest layer, while processing two or more of the smallest layers on another multi-core processor. Such grouping can reduce roundtrip delays and improve efficiency.

A computation iteration of the parallel training 220 can execute the following steps: parallel DNN processing of a plurality of acoustic features, feature pooling (e.g., attention pooling) to generate a vector for abstracted features, and parallel feed forward processing using three models (and a single vector) in feed forward layers corresponding to SSD, speaker identification, and channel classification. As a result, with the training of these tasks that are relevant to each other being performed at the same time, more robust features are learned by a back-propagation (BP) algorithm in some examples.

Thus, by using the parallel training 220 and the training data 216, the training engine 202 can produce the trained DNN 208 from the DNN 204. In turn, the data analysis engine 206 can use the trained DNN 208 to produce output data 234 from the input data 236. In some examples, the data analysis engine 206 may be an SSD engine that uses the trained DNN 208 in the form of trained context-dependent DNN-HMMs to produce output data 234 in the form of identification of synthetic media voices in the analyzed content.

The data analysis engine 206 can be executed on the computing device 210 or a computing device that is similar to the computing device 210. Moreover, the data analysis engine 206 can receive live input data 236 from a microphone and audio processing components of the computing device 210, which can be, e.g., a smartphone computing device 104(5) shown in FIG. 1. In various examples, the data analysis engine 206 can receive input data 236 from a media file or stream, for example for the purpose of audio-indexing of the spoken content in the media file/stream. In some examples, the data analysis engine 206 can also be a speech verification engine that uses the trained context-dependent DNNs to authenticate received speech audio.

In some examples, parallel training 220, as enhanced with one or more of the techniques described herein. e.g., techniques 224 and 226, can be implemented to produce the trained context-independent DNN 208 under other scenarios that exhibit similar characteristics. In this way, context-independent forms of the DNN 204 can be trained with appropriate training data for a variety of data analysis purposes. The characteristics can include a larger set of training data (e.g., greater than 50 million, 1.3 billion, etc., samples), the DNN structures in which the output of each network of the DNNs exceeds a threshold (e.g., greater than two thousand, four thousand, etc. outputs from a DNN), or so forth. The data analysis purposes can include using trained context-independent DNNs for different activities.

In contrast to the conventional SSD methods, speaker recognition is adapted within the present disclosure to increase the robustness of one or more models. In some examples, synthetic speech and true human recoding of the same speaker are regarded as two different speakers. i.e., speaker-recording and speaker-TTS. By applying one or more examples, the present disclosure is able to not only distinguish whether the input sample is from TTS, but also which voice the TTS sample is from. In some examples, adaptation for inset and outset speakers is provided, such that after adaptation, the performance of the target speaker without regression on other speakers is improved. As should be appreciated, this process also works for scaling to unseen TTS voices by other TTS producers.

Within this framework, in some example, unified online SSD services are provided. For example, LA attacks (including codec attacks), speaker recognition tasks, and adaptation are provided by a batch API. In some examples, replayed TTS is also provided. The processes described herein are not limited to SSD, but can be implemented with different types of computer tasks in different applications. With the present disclosure, improved SSD using less computational resources is performed. As such, detection accuracy can be maintained while having the reduced "cost" (e.g., computational and/or storage requirements) of the operations being performed on a less complex optimization problem. In some example, the robustness of the SSD is increased.

Figure 3:
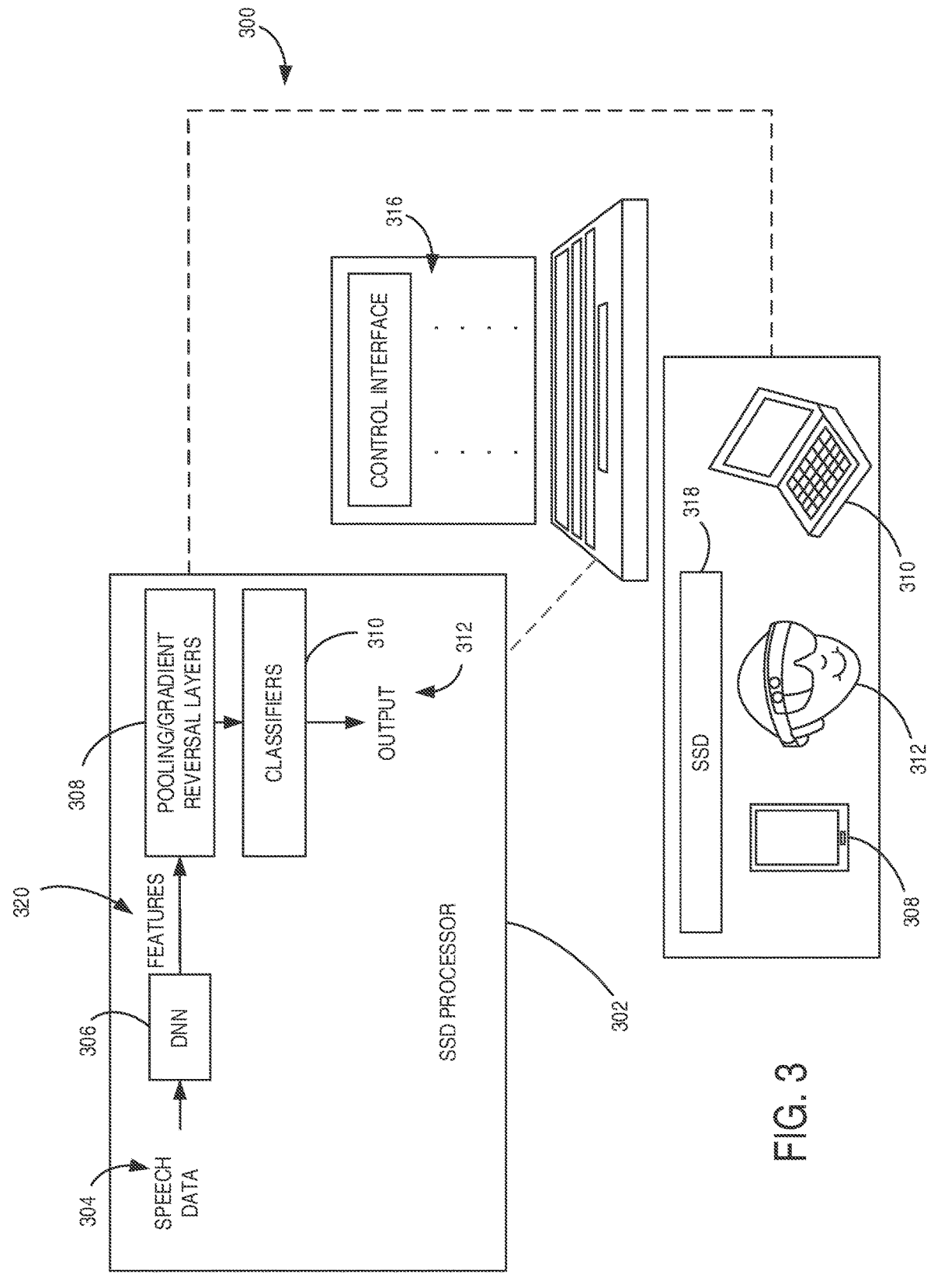
FIG. 3 is a block diagram of an SSD system according to an example.

Various examples include an SSD system 300 as illustrated in FIG. 3. The SSD system 300 in one example uses parallel processing of different models to generate an output 312, which in one example is detected synthetic speech in processed audio. More particularly, the SSD system 300 includes an SSD processor 302 that is configured in some examples as a processing engine that performs training for SSD on speech data 304, which includes one or more voices. It should be noted that the speech data 304 can include different types of speech data configured in different ways. It should also be noted that the present disclosure can be applied to different types of data, including non-speech data.

The SSD processor 302 has access to input data, such as the speech data 304, which can include speech training data. For example, the SSD processor 302 accesses speech training data (e.g., a large dataset using different TTS acoustic models and vocoders, and thousands of speakers) as the input data for use in training for SSD. It should be appreciated that the SSD processor 302 is configured to train for SSD tasks with parallel processing of different features.

In the illustrated example, the speech data 304 includes voice data, wherein the SSD processor 302 first processes the speech data 304 with a DNN 306. For example, a plurality of extracted acoustic features from the speech data 304 is passed through one or more DNNs 306. In one example, the DNNs 306 are configured to include one or more of:

A residual neural network (ResNet), such as ResNet 18 (except the final Feed-Forward Deep Neural Network (FFDNN) layer). SEResNet, Res2Net, and/or SERes2Net, among others;

A light convolutional neural network (LCNN), such as an STC2 LCNN (except the final FFDNN layer);

Bi-directional long short-term memory (BLSTM), such as a 3-layer BLSTM with 128 units for each direction; and/or A FFDNN, such as 2-layer FFDNN with 1024 units for each classifier.

As described in more detail herein, the one or more DNNs 306 identify a plurality of features 320 (e.g., abstracted features) from the speech data 304. In one example, the speech data 304 has one or more of the following properties: Mel/Linear filter based spectrogram (e.g., 257-dim log power spectrogram (LPS)), CMVN/CMN/NULL, random disturbance, SpecAugmetation, noise/reverberation augmentation, and adversarial examples.

The features are processed by a one or more layers configured for pooling and gradient reversal (pooling/gradient reversal layers 308). In one example, the pooling/gradient reversal layers 308 are configured having a pooling layer performing one or more of temporal average pooling (TAP) and multi-head attentive pooling (MAP) and a gradient reversal layer that is domain/channel/codec independent as described in more detail herein. For example, the pooling/gradient reversal layers 308 are configured to perform attention pooling that gives each of a plurality of feature vectors a weight and generates an average vector, wherein the weighting determines the corresponding accuracy.

In various implementations, different aspects of using neural networks and other components described herein can be configured to operate alone or in combination or sub-combination with one another. For example, one or more implementations of the pooling/gradient reversal layers 308 can be used to implement neural network training via gradient descent and/or back propagation operations for one or more neural networks.

The output of the pooling/gradient reversal layers 308 is processed by classifiers 310, which in one example comprise feed-forward layers with separate models for SSD, speaker identification, and channel/domain classification training as described in more detail herein.

As one example, in this multi-task solution, the input feature and feature transform operations include using 257-dim log power spectrogram (LPS) as an input acoustic feature, then ResNet18 is used to do sequence-to-sequence feature transformation. In this example, the pooling layer of the pooling/gradient reversal layers 408, is multi-head attention pooling. After processing by the pooling layer, SSD, speaker identification and channel classification task are learned simultaneously. These tasks are relevant to each other and facilitate learning more robust features, for example, by a back-propagation (BP) algorithm.

Figure 4:
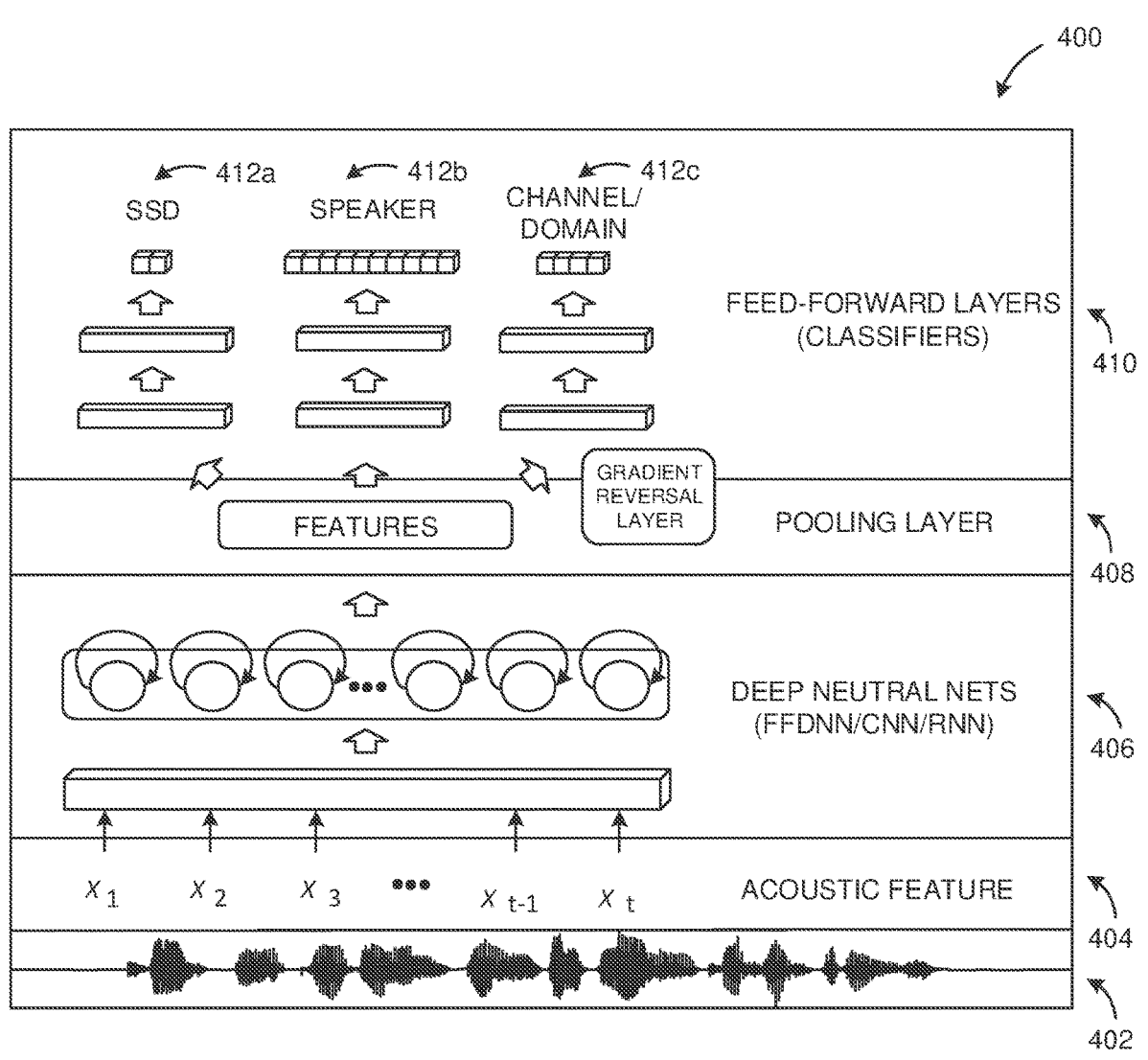
FIG. 4 is a block diagram illustrating a multi-task architecture according to an example.

In the training phase, all three tasks (i.e., SSD, speaker identification and channel classification) are trained in parallel, and a loss function (e.g., L2-constrained softmax loss function and cross-entropy (label smoothing)) is calculated for each task accordingly as illustrated in FIG. 4 (showing a multi-task architecture 400). Then the BP algorithm is used to update the parameters of each feed-forward (classifier) layers and shared pooling and feature transformation layers. Thus, the shared DNNs in various examples learn more robust and powerful features for all the tasks. It should be noted that in the inference phase, the channel task is ignored. If speaker information is needed, both the SSD and speaker classification tasks are included in the inference stage. However, if an operation is being performed to distinguish if the input sample is TTS or true human recording, then only the SSD task is enabled in one example.

With reference in particular to FIG. 4, the multi-task architecture 400 is implemented by the SSD processor 302 in some examples. As can be seen, acoustic features 404 are extracted from a training input 402 (e.g., voice/speech input). In one example, one of more signal processing algorithms in the feature extraction technology are used to perform the feature extraction. The extracted features are processed by the DNNs 406, which operate as an encoding layer in one example and perform a frame to frame transform, the output (e.g. a feature sequence having abstracted features with a larger or higher dimension) of which is provided to a pooling layer 408. Thus, the features are more distinguishable after processing by the DNNs 406 (e.g., synthetic features and human features).

In one example, the pooling layer 408 is configured as an embedding layer that uses the abstracted feature to generate a single vector or a single label for the entire sequence of the training input 402 (e.g., a single vector is generated for a plurality of abstracted features for the entire sequence and not for each of the individual frames, such as one label for the entire sequence of the training input). In one example, the pooling layer 408 allows for training using pooling training data for multiple channels (e.g., shared training data). In some examples, a deep learning acoustic model can be trained by pooling data from a plurality of different contexts and/or for a plurality of different tasks.

In one example, the pooling layer 408 combines local feature vectors to obtain a global feature vector (e.g., a single vector of the abstracted features corresponding to the training input by averaging the vectors corresponding to the abstracted features from the DNNs 406 using one or more weighting functions) represented by the pooling layer 408, which can be configured as a max-pooling layer. The pooling layer 408 in some examples is configured to perform a max pooling operation over a defined time period, such that the most useful, partially invariant, local features produced by the DNNs 406 are retained. In one example, a fixed sized global feature vector (e.g., a single weighted vector shared with a plurality of models 412 configured as classification models) representing the pooling layer 408 is then fed into the feed-forward layers 410.

The feed-forward layers 410 include multiple classifiers, which in the illustrated example includes separate models for SSD, speaker identification, and channel/domain classification. That is, these three separate tasks are combined into the single framework defined by the multi-task architecture 400 and performed in parallel. As can be seen, the feed-forward layers 410 share the same DNNs 406, which learns features for all three of the tasks performed in the feed-forward layers 410.

Thus, the DNNs 406 in some examples are used to train models 412 on tasks such as SSD, speaker identification, and channel/domain classification. It should be appreciated that different or additional models 412 can be implemented. In some examples, the DNNs 406 or other neural networks are trained by back-propagation using the gradient reversal layer or other gradient descents. For example, stochastic gradient descent is a variant used for scalable training. In stochastic gradient descent, the training inputs are processed in a random order. The inputs may be processed one at a time with the subsequent steps performed for each input to update the model weights (e.g., the weights for the models 412). As should be appreciated, each layer of the DNNs 406 can have a different type of connectivity. For example, individual layers can include convolutional weighting, non-linear transformation, response normalization, and/or pooling.

It should be noted that the DNNs 406 can be configured in different ways and for different applications. In one example, a stack of different types of neural network layers can be used in combination with the model 412 to define a deep learning based acoustic model that can used to represent different speech and/or acoustic factors, such as phonetic and non-phonetic acoustic factors, including accent origins (e.g. native, non-native), speech channels (e.g. mobile. Bluetooth, desktop etc.), speech application scenario (e.g. voice search, short message dictation etc.), and speaker variation (e.g. individual speakers or clustered speakers), etc.

Referring again to FIG. 3, with respect to the SSD processor 302, various parameters, etc. can be specified by an operator. For example, an operator is able to specify weighting values of different layers of the neural network topology, the sensitivity of different models/attentions, etc. using a graphical user interface 316. For example, once the operator has configured one or more parameters, the SSD processor 302 is configured to perform SSD training as described herein. It should be noted that in some examples, once the training of one or more neural networks is complete (for example, after the training data is exhausted) a trained SSD 318 is stored and loaded to one or more end user devices such as a smart phone 308, a wearable augmented reality computing device 312, a laptop computer 310 or other end user computing device. The end user computing device is able to use the trained SSD 318 to carry out one or more tasks, such as for detection of synthetic speech.

Figure 5:
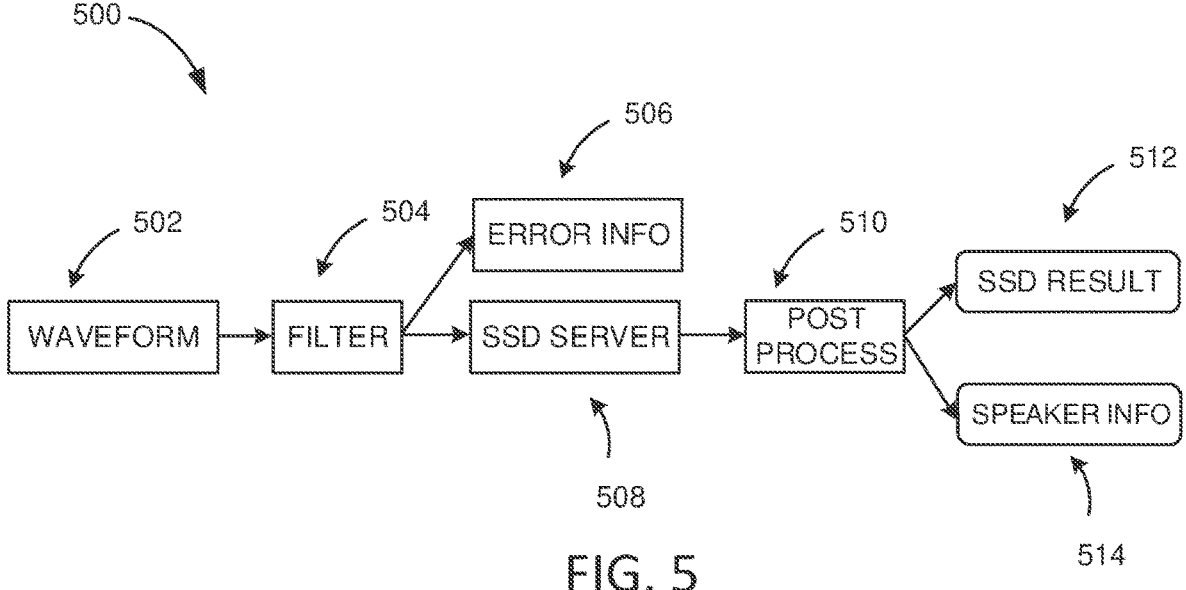
FIG. 5 is a block diagram illustrating a process flow for performing SSD according to an example.

An example of a process flow 500 is illustrated in FIG. 5. The process flow 500 in some examples includes SSD operations performed using one or more trained models as described in more detail herein. In the illustrated example, a waveform 502 is fed through a filter 504. For example, the waveform 502 (e.g., audio) may be from a TTS server or the Internet and is filtered prior to SSD processing. The filter 504 is configured to perform segmentation (e.g., to extract acoustic features from the waveform 502) and check the quality of the audio in one example. It should be noted that if the quality of the audio of the waveform 502 does not meet a defined threshold quality, then the waveform 502 is not processed and error information 506 generated. For example, an error indicator is provided to a user indicating that the waveform 502 does not meet one or more audio quality checks or criteria to be processed. If the filtered waveform 502 mees the threshold quality level, then the filtered waveform 502 is processed by an SSD server 508 trained according to the present disclosure.

For example, the SSD server 508 in one example is trained to perform three different classifications using different models, such as to perform an SSD task, a speaker classification task, and a channel classification task. It should be noted that in various examples, the channel refers to a type of codec (e.g., MP3. MP4, etc.). In one example, the SSD server 508 processes one or more input segments of the filtered waveform 502 to generate a log probability value or score. That is, using the trained models, a log probability that the waveform includes synthetically generated speech is determined. The score in some examples is indicative of the likelihood that the waveform 502 includes synthetically generated speech.

In one example, the output of the SSD server 508 is subjected to post processing 510, which can include converting the score to user-friendly information to show the SSD results 512 and optionally speaker information 514. For example, a graphical user interface or other display (e.g., a results dashboard) is generated and displayed to the user that identifies the results of the processing to determine whether the waveform 502 includes synthetic speech. The SSD results 512 can be displayed in different forms and formats, such as using different graphics, displays, etc.

Thus, various examples provide a speech detection system for detecting when speech is synthetically generated. In these examples, instead of a synthetic speech detection system that includes a singlet-tasked architecture, one or more implementations of the present disclosure includes the multi-task architecture 400, configured as a multi-task learning architecture. The multi-task architecture 400 is utilized and configured to consider synthetic speech detection, speaker identification, and channel classification at the same time. In some examples, information from one aspect (classification) is used by the others in determining synthetic speech detection, identifying speakers, and classifying a channel as described in more detail herein. In one example, the detection processing is used to identify at least two out of the three of SSD, speaker, and channel domain classification (e.g., learning architecture where SSD is determined, but speaker or channel data is considered as input/training data).

Figure 6:
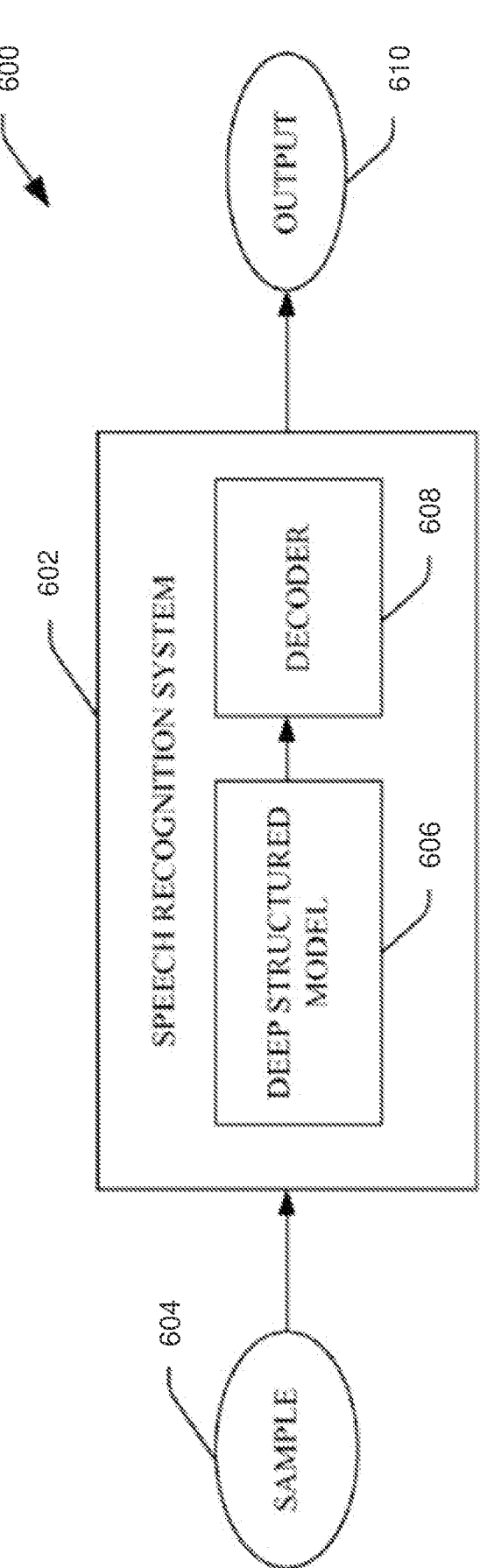
FIG. 6 is a block diagram illustrating a speech recognition system according to an example.

In some examples, a system 600 as illustrated in FIG. 6 is provided. For example, the system 600 is configured to perform automatic speech recognition (ASR) to detect synthesized or synthetically generated audio, particularly synthesized or synthetically generated speech. The system 600 includes a speech recognition system 602 that receives a sample 604. The sample 604 can be audio that includes words or other audible speech over a particular time period (e.g., recorded audio over a defined time period). While the examples provided herein are described in connection with the sample 104 being speech (e.g., a spoken utterance), it should be appreciated that the system 100 can be configured to perform other types of recognition operations, such as online handwriting recognition and/or real-time gesture recognition. Thus, the sample 304 in some examples can be an online handwriting sample or a video signal describing movement of an object such as a human being.

The speech recognition system 602 comprises a deep-structured model 606. In one example, the deep-structured model 606 can be a Deep Belief Network (DBN), wherein the DBN is temporally parameter-tied. The DBN in one example is a probabilistic generative model with multiple layers of stochastic hidden units above a single bottom layer of observed variables that represent a data vector. For example, the DBN is a densely connected, directed belief network with many hidden layers for which learning is a difficult problem. The deep-structured model 606 can receive the sample and output state posterior probabilities with respect to an output unit, which can be a phone, a senone, or some other suitable output unit. The deep-structured model 606 is generated through a pretraining procedure, and thereafter weights of the deep-structured model 606, transition parameters in the deep-structured model 606, language model scores, etc. can be optimized jointly through sequential or full-sequence learning. As described in more detail herein, the deep-structured model 606 operates in combination with a plurality of classifiers (e.g., separate classification models for a plurality of tasks). In one example, and with reference also to FIG. 4, the SSD model 412a is optimized using the speaker classification model 412b and the channel/domain classification model 412c. That is, learning using the speaker classification model 412b and the channel/domain classification model 412c is used by the SSD model 412a to provide more robust training. Thus, speech detection operations for detecting when speech is synthetically generated is performed using a task learning architecture that considers synthetic speech detection, speaker identification (voice identity), and channel classification (e.g., codec classification). That is, information from one model 412 is used by the other models 412 to perform training for synthetic speech detection, identifying speakers and classifying a channel (e.g., the effect of the channel from the channel/domain classification model 412c, such as the codec encoding is considered by the SSD model 412a).

The speech recognition system 602 additionally includes a decoder 608, which can decode output of the deep-structured model 606 to generate an output 610. The output 610, in one example, can include an indication of a word or word sequence that was received as the sample 604 that includes synthetic speech.

The speech recognition system 602 can be deployed in a variety of contexts. For example, the speech recognition system 602 can be deployed in a mobile telephone, an automobile, industrial automation systems, banking systems, and other systems that employ ASR technology.

Thus, with various examples, SSD operations can be trained and performed, such as to detect different types of attacks (e.g., codec attacks).

Figure 7:
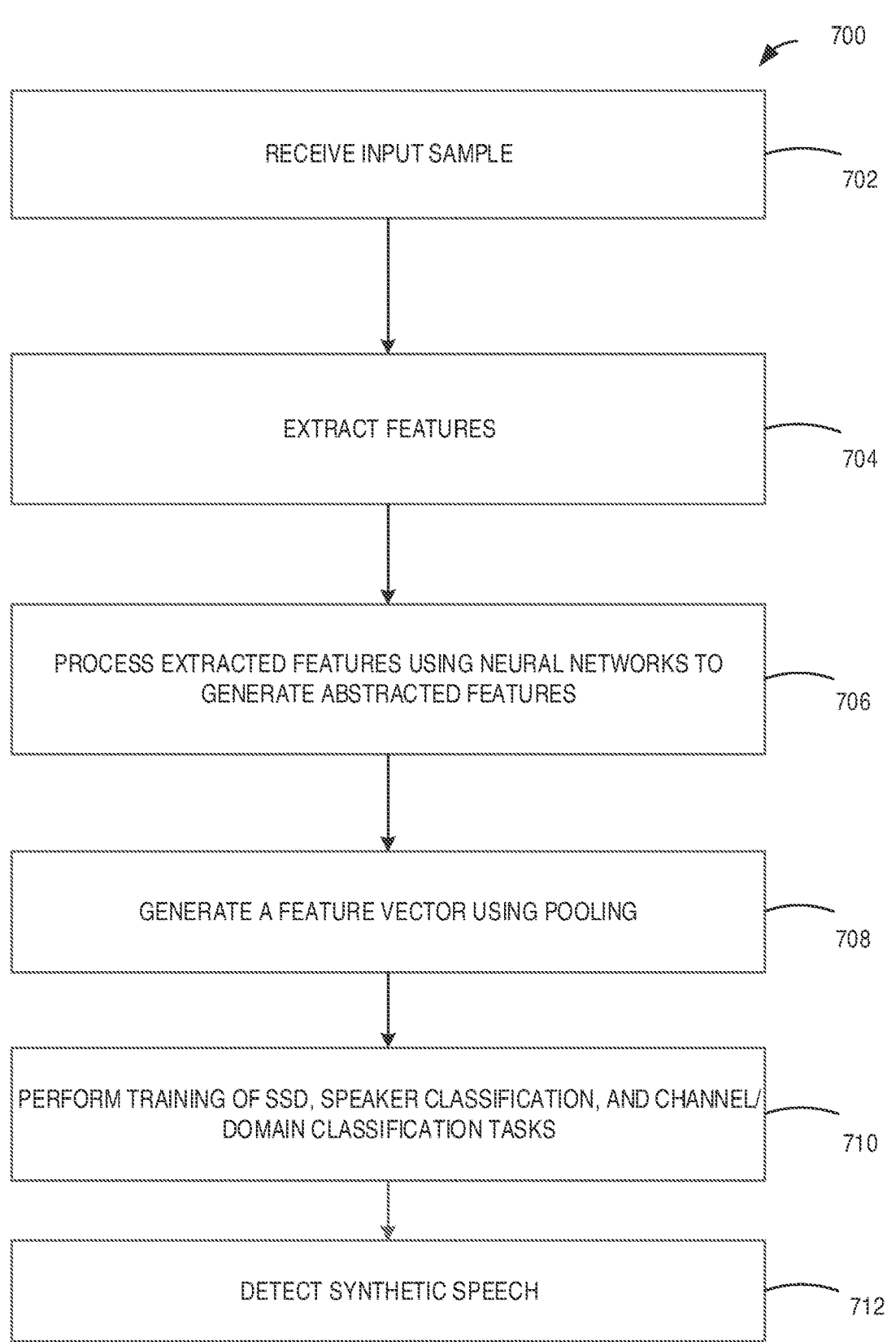
FIG. 7 is a flow chart illustrating operations of a computing device to perform SSD according to an example.

As should be appreciated, the various examples can be used in the training and operation of different types of neural networks and for different types of SSD. Additionally, the various examples can be used to perform SSD with different types of data. FIG. 7 illustrates a flow chart of a method 700 for performing SSD of various examples. The operations illustrated in the flow chart described herein can be performed in a different order than is shown, can include additional or fewer steps, and can be modified as desired or needed. Additionally, one or more operations can be performed simultaneously, concurrently, or sequentially. The method 700 is performed in some examples on computing devices, such as a server or computer having processing capabilities to efficiently perform the operations.

With reference to the method 700, illustrating a method for SSD, a computing device receives an input sample at 702. For example, as described herein, different types of voice or speech data input are received. The computing device extracts features, in particular acoustic features, from the input sample at 704. For example, a plurality of acoustic features from an audio input are extracted.

The computing device processes the extracted features using one or more neural networks at 706. For example, as described herein, a set of DNNs are used to process the extracted features to generate abstracted features. That is, a plurality of abstracted features corresponding to the extracted features are generated by the DNNs. Pooling is then performed on the plurality of abstracted features to generate a feature vector at 708. In some examples, a single feature vector corresponding to all of the abstracted features is generated. The feature vector can be generated using different techniques, including different weighting schemes, combination schemes, etc.

Training of a plurality of tasks is performed using the single feature vector at 710. For example, as described in more details herein, SSD task training, speaker classification task training, and channel/domain classification task training are performed simultaneously. Thus, in some examples, the SSD task training, speaker classification task training, and channel/domain classification task training are performed at the same time. In other examples, the SSD task training, speaker classification task training, and channel/domain classification task training are performed at substantially a same time. That is, the SSD task training, speaker classification task training, and channel/domain classification task training are performed together, but not at the exact same time (e.g., concurrently). In some examples, the SSD task training, speaker classification task training, and channel/domain classification task training are performed within a same time interval, but have different start and/or end times for processing.

In one example, different models use a shared output from the DNNs to train for performing the various tasks. In some examples, the training of the tasks are performed concurrently or partially sequentially. With the different processing tasks trained at 710 using different attention models. SSD operations are thereby trained and optimized. That is, using shared DNNs and training the plurality of tasks at the same time or substantially a same time allows for optimization of one or more desired SSD target tasks.

With the trained models, SSD operations can be performed, such as to detect (e.g., identify) synthetic speech at 712. For example, with the SSD operations, one or more attacks (e.g., PA or LA), or potential attacks can be identified, or predicted in some examples.

One or more examples can be used in different applications. For example, the present disclosure is implementable in connection with one or more of:

1. Voice talents to create a synthetic voice from individual's own voice since the synthetic voice can be detected and so potential misuse can be reduced or mitigated.
2. Developers of voice authentication to prevent the use of synthetic voice to attack the system.
3. End users can identify potentially deceiving synthetic media falsely identified to be from the original speaker and have more confidence in building a synthetic voice as a voicebank purpose for future use.
4. The capability to check for potential violation of terms of use and to investigate an abuse report from the public.

In an end-user interface (e.g. web browser, audio players, smart phones, smart speakers) with respect to text-to-speech applications.

Exemplary Operating Environment

Figure 8:
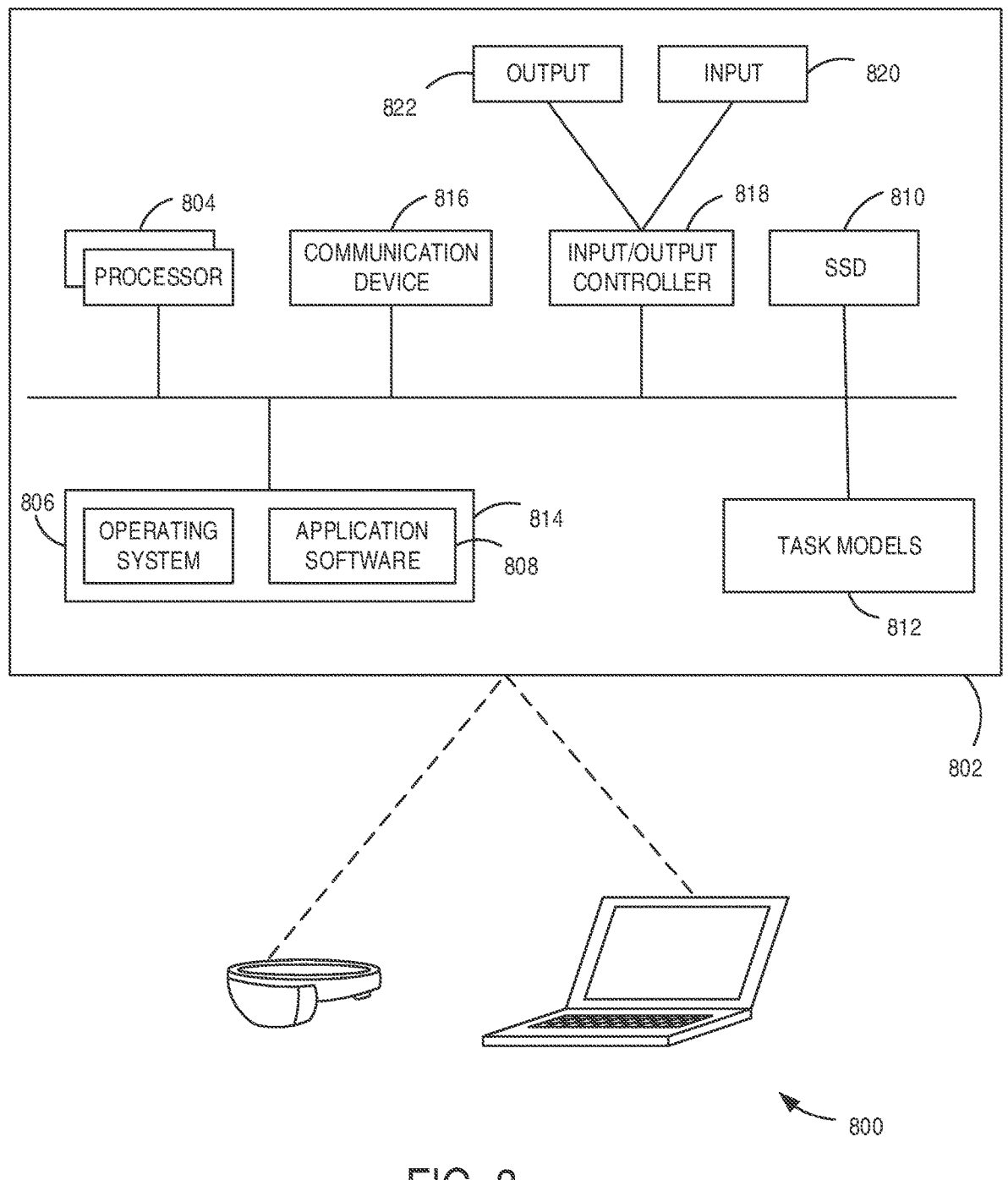
FIG. 8 illustrates a computing apparatus according to example as a functional block diagram.

The present disclosure is operable with a computing apparatus 802 according to an example as a functional block diagram 800 in FIG. 8. In one example, components of the computing apparatus 802 may be implemented as a part of an electronic device according to one or more embodiments described in this specification. The computing apparatus 802 comprises one or more processors 804 which may be microprocessors, controllers, or any other suitable type of processors for processing computer executable instructions to control the operation of the electronic device. Platform software comprising an operating system 806 or any other suitable platform software may be provided on the apparatus 802 to enable application software 808 to be executed on the device. According to an example, SSD 810 that is trained using a plurality of task models 812 can be accomplished by software.

Computer executable instructions may be provided using any computer-readable media that are accessible by the computing apparatus 802. Computer-readable media may include, for example, computer storage media such as a memory 814 and communications media. Computer storage media, such as the memory 814, include volatile and nonvolatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology. CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 814) is shown within the computing apparatus 802, it will be appreciated by a person skilled in the art, that the storage may be distributed or located remotely and accessed via a network or other communication link (e.g. using a communication interface 816).

The computing apparatus 802 may comprise an input/output controller 818 configured to output information to one or more input devices 820 and output devices 822, for example a display or a speaker, which may be separate from or integral to the electronic device. The input/output controller 818 may also be configured to receive and process an input from the one or more input devices 820, for example, a keyboard, a microphone, or a touchpad. In one embodiment, the output device 822 may also act as the input device 820. An example of such a device may be a touch sensitive display. The input/output controller 818 may also output data to devices other than the output device 822, e.g. a locally connected printing device. In some embodiments, a user may provide input to the input device(s) 820 and/or receive output from the output device(s) 822.

In some examples, the computing apparatus 802 detects voice input, user gestures or other user actions and provides a natural user interface (NUI). This user input may be used to author electronic ink, view content, select ink controls, play videos with electronic ink overlays and for other purposes. The input/output controller 818 outputs data to devices other than a display device in some examples, e.g. a locally connected printing device.

The functionality described herein can be performed, at least in part, by one or more hardware logic components. According to an embodiment, the computing apparatus 802 is configured by the program code when executed by the processor(s) 804 to execute the examples and implementation of the operations and functionality described. Alternatively. or in addition, the functionality described herein can be performed, at least in part, by one or more hardware logic components. For example, and without limitation, illustrative types of hardware logic components that can be used include FPGAs. ASICs. ASSPs, SOCs, CPLDs. and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A computerized method for synthetic speech detection, the computerized method comprising:
receiving an input sample comprising audio;
extracting acoustic features corresponding to speech in the audio;
processing the extracted acoustic features using a plurality of neural networks to output abstracted features;
generating a feature vector corresponding to the abstracted features using pooling;
performing training of an SSD task, a speaker classification task, and a channel classification task, at a same time, using the feature vector; and
detecting synthetic speech using at least the trained SSD task.

Other examples include:

A system for synthetic speech detection, the system comprising:
at least one processor; and
at least one memory comprising computer program code, the at least one memory and the computer program code configured to, with the at least one processor, cause the at least one processor to:
receive an input sample comprising audio;
extract acoustic features corresponding to speech in the audio;
process the extracted acoustic features using a plurality of neural networks to output abstracted features;
generate a feature vector corresponding to the abstracted features using pooling;
perform training of an SSD task, a speaker classification task, and a channel classification task, at a same time, using the feature vector; and
detect synthetic speech using at least the trained SSD task.

Other examples include:

One or more computer storage media having computer-executable instructions for synthetic speech detection that, upon execution by a processor, cause the processor to at least:
receive an input sample comprising audio;
receive an input sample comprising audio;
filter the audio;
use a deep structured model to process the filtered audio, the deep structured model developed with training of an SSD task, a speaker classification task, and a channel classification task, at a same time; and
detect synthetic speech using the processed audio.

Alternatively, or in addition to the examples described above, examples include any combination of the following:
wherein the training is performing using a feed-forward layer comprising an SSD model, a speaker classification model, and a channel classification model having shared information.
wherein the feature vector is only one vector corresponding to all of the abstracted features.
wherein the plurality of neural networks are deep neural networks (DNNs) having an output shared by an SSD model, a speaker classification model, and a channel classification model used to perform the training.
further comprising identifying at least one of a physical attack (PA) and a logical attack (LA) using the detected synthetic speech.
wherein the pooling comprises an averaging operation using a plurality of weights corresponding to the extracted acoustic features.
further comprising using a gradient reversal layer in combination with the pooling to generate the feature vector.
further comprising generating a log probability that one or more input segments of the audio in the input sample are synthetic speech.
wherein the log probability defines a score of a corresponding to a likelihood that the one or more input segments are synthetic speech.
further comprising converting the score to user displayable information showing SSD results and speaker information corresponding to the score.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for training a neural network. The illustrated one or more processors 1004 together with the computer program code stored in memory 1014 constitute exemplary processing means for fusing multimodal data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The phrase "one or more of the following: A, B, and C" means "at least one of A and/or at least one of B and/or at least one of C." The phrase "and/or", as used in the specification and in the claims, should be understood to mean "either or both" of the elements so conjoined. i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one." in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B")

can refer, in one implementation, to at least one, optionally including more than one. A, with no B present (and optionally including elements other than B); in another implementation, to at least one, optionally including more than one, B, with no A present (and optionally including elements other than A); in yet another implementation, to at least one, optionally including more than one, A. and at least one, optionally including more than one. B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for synthetic speech detection (SSD), the computerized method comprising:
   receiving an input sample comprising audio;
   extracting a plurality of acoustic features corresponding to speech in the audio;
     processing the plurality of extracted acoustic features in parallel using a plurality of neural networks to output abstracted feature vectors, wherein the plurality of neural networks includes at least deep neural networks (DNNs) having a shared output used to perform training of an SSD model, a speaker classification model, and a channel classification model;
     generating, via the plurality of neural networks, a pooled feature vector from the output abstracted feature vectors using a pooling operation, wherein the pooling operation comprises multi-head attentive pooling that assigns to each of the output abstracted feature vectors, a respective attention weight, used to generate the pooled feature vector, and wherein the pooled feature vector is a single vector;
     performing the training of an SSD task of the SSD model, a speaker classification task of the speaker classification model, and a channel classification task of the channel classification model, at substantially a same time, using the pooled feature vector; and
     detecting synthetic speech using at least the SSD task of the SSD model.

2. The computerized method of claim 1, wherein the training is performed using a feed-forward layer comprising the SSD model, the speaker classification model and the channel classification model having shared information.

3. The computerized method of claim 1, further comprising identifying at least one of a physical attack (PA) and a logical attack (LA) using the detected synthetic speech.

4. The computerized method of claim 1, wherein the pooling operation further comprises an averaging operation using a plurality of weights corresponding to the plurality of extracted acoustic features.

5. The computerized method of claim 1, further comprising using a gradient reversal layer in combination with the pooling operation to generate the pooled feature vector.

6. A system for synthetic speech detection (SSD), the system comprising: at least one processor; and
   at least one memory comprising computer program code, the at least one memory and the computer program code configured to, with the at least one processor, cause the at least one processor to:
     receive an input sample comprising audio;

extract a plurality of acoustic features corresponding to speech in the audio;

process the plurality extracted acoustic features in parallel using a plurality of neural networks to output abstracted feature vectors wherein the plurality of neural networks includes at least deep neural networks (DNNs) having a shared output used to perform training of an SSD model, a speaker classification model, and a channel classification model;

generate, via the plurality of neural networks, a pooled feature vector from to the output abstracted feature vectors using a pooling operation, wherein the pooling operation comprises multi-head attentive pooling that assigns to each of the output abstracted feature vectors, a respective attention weight, used to generate the pooled feature vector, and wherein the pooled feature vector is a single vector;

perform the training of an SSD task of the SSD model, a speaker classification task of the speaker classification model, and a channel classification task of the channel classification model, at substantially a same time, using the pooled feature vector; and detect synthetic speech using at least the SSD task of the SSD model.

7. The system of claim 6, wherein the training is performed using a feed-forward layer comprising the SSD model, the speaker classification model, and the channel classification model having shared information.

8. The system of claim 6, further comprising identifying at least one of a physical attack (PA) and a logical attack (LA) using the detected synthetic speech.

9. The system of claim 6, wherein the pooling operation further comprises an averaging operation using a plurality of weights corresponding to the plurality of extracted acoustic features.

10. The system of claim 6, further comprising using a gradient reversal layer in combination with the pooling operation to generate the feature vector.

11. One or more computer storage media having computer-executable instructions for synthetic speech detection (SSD) that upon execution by a processor, cause the processor to:

receive an input sample comprising audio;

filter the audio to extract a plurality of acoustic features corresponding to speech in the audio of the input sample;

process the plurality of extracted acoustic features in parallel using a plurality of neural networks to output abstracted feature vectors, wherein the plurality of neural networks includes at least deep neural networks (DNNs) having a shared output used to perform training of an SSD model, a speaker classification model, and a channel classification model;

generate, via the plurality of neural networks, a pooled feature vector from the output abstracted feature vectors using a pooling operation, wherein the pooling operation comprises multi-head attentive pooling that assigns to each of the output abstracted feature vectors, a respective attention weight, used to generate the pooled feature vector, and wherein the pooled feature vector is a single vector;

perform the training of an SSD task of the SSD model, a speaker classification task of the speaker classification model, and a channel classification task of the channel classification model, at substantially a same time, using the pooled feature vector; and detect synthetic speech using at least the SSD task of the SSD model.

12. The one or more computer storage media of claim 11, having further computer-executable instructions that cause the processor to:

decode the processed audio to generate an output, the output including an indication of a word or word sequence received as part of the input sample that includes the detected synthetic speech.

13. The one or more computer storage media of claim 11, having further computer-executable instructions that cause the processor to:

generate a log probability that one or more input segments of the audio in the input sample are the synthetic speech.

14. The one or more computer storage media of claim 13, wherein the log probability defines a score corresponding to a likelihood that the one or more input segments are the synthetic speech.

15. The one or more computer storage media of claim 14, having further computer-executable instructions that cause the processor to:

convert the score to user displayable information showing SSD results and speaker information corresponding to the score.

16. The one or more computer storage media of claim 11, having further computer-executable instructions that cause the processor to:

identify at least one of a physical attack (PA) or a logical attack (LA) using the detected synthetic speech.

* * * * *